(12) United States Patent
Fernandes

(10) Patent No.: US 9,754,260 B2
(45) Date of Patent: Sep. 5, 2017

(54) ACCOUNT LOCKING USING TRANSACTION CODES

(71) Applicant: Quisk, Inc., Sunnyvale, CA (US)

(72) Inventor: Jorge M. Fernandes, Los Altos, CA (US)

(73) Assignee: Quisk, Inc., Sunnyvale, CA (US)

( * ) Notice: Subject to any disclaimer, the term of this patent is extended or adjusted under 35 U.S.C. 154(b) by 693 days.

(21) Appl. No.: 14/065,315

(22) Filed: Oct. 28, 2013

(65) Prior Publication Data
US 2015/0120546 A1 Apr. 30, 2015

(51) Int. Cl.
G06Q 40/00 (2012.01)
G06Q 20/40 (2012.01)
G06Q 20/34 (2012.01)
G06Q 20/42 (2012.01)

(52) U.S. Cl.
CPC ....... *G06Q 20/405* (2013.01); *G06Q 20/3578* (2013.01); *G06Q 20/42* (2013.01)

(58) Field of Classification Search
USPC .................................................. 705/35–44
See application file for complete search history.

(56) References Cited

U.S. PATENT DOCUMENTS

| | | | |
|---|---|---|---|
| 5,708,422 A | 1/1998 | Blonder et al. | |
| 5,826,243 A | 10/1998 | Musmanno et al. | |
| 5,914,472 A | 6/1999 | Foladare et al. | |
| 5,953,710 A | 9/1999 | Fleming | |
| 5,957,810 A | 9/1999 | Ohashi et al. | |
| 6,108,641 A | 8/2000 | Kenna et al. | |
| 6,173,269 B1 | 1/2001 | Sokol et al. | |
| 6,285,991 B1 | 9/2001 | Powar | |
| 6,609,113 B1 | 8/2003 | O'Leary et al. | |
| 6,625,602 B1 | 9/2003 | Meredith et al. | |

(Continued)

FOREIGN PATENT DOCUMENTS

| | | |
|---|---|---|
| DE | 10240420 A | 3/2004 |
| WO | 2005008383 A2 | 1/2005 |

(Continued)

OTHER PUBLICATIONS

General Questions—SMS Banking, Standard Chartered Bank, Accessed on Oct. 24, 2013, http://www.standardchartered.com.sg/online-banking-demo/smsbanking/faq_content.html.

(Continued)

*Primary Examiner* — Olabode Akintola
(74) *Attorney, Agent, or Firm* — The Mueller Law Office, P.C.

(57) ABSTRACT

Described herein are systems and computer-implemented methods for configuring a payment account in an account hierarchy using transaction codes that carry transaction information. The transaction codes carry sufficient information to help inform a decision of whether to lock the payment account so as to prevent an initiated transaction from completing. The decision can be fully-automated based on rules and/or intelligent machine analysis. The systems and methods can also seek, in real-time, authorization from an account administrator. The systems and methods can also allow the administrator to create a locking rule for the payment account. The administrator can be identified using the account hierarchy.

27 Claims, 8 Drawing Sheets

(56) References Cited

U.S. PATENT DOCUMENTS

| | | |
|---|---|---|
| 6,796,497 B2 | 9/2004 | Benkert et al. |
| 7,249,092 B2 | 7/2007 | Dunn et al. |
| 7,398,250 B2 | 7/2008 | Blinn et al. |
| 7,440,922 B1 | 10/2008 | Kempkes et al. |
| 7,578,438 B2 | 8/2009 | Hogg et al. |
| 7,587,196 B2 | 9/2009 | Hansen |
| 7,676,432 B2 | 3/2010 | Ling |
| 7,873,573 B2 | 1/2011 | Realini |
| 7,900,834 B2 | 3/2011 | Mulcahy |
| 7,909,246 B2 | 3/2011 | Hogg et al. |
| 7,945,512 B2 | 5/2011 | Scipioni et al. |
| 8,024,271 B2 | 9/2011 | Grant |
| 8,127,982 B1 | 3/2012 | Casey et al. |
| 8,195,574 B2 | 6/2012 | Buehler et al. |
| 8,266,205 B2 | 9/2012 | Hammad et al. |
| 8,538,863 B1 | 9/2013 | Saunders |
| 8,645,250 B2 * | 2/2014 | Boding .............. G06Q 20/4016 705/35 |
| 2002/0095386 A1 | 7/2002 | Maritzen et al. |
| 2003/0061157 A1 | 3/2003 | Hirka et al. |
| 2003/0141361 A1 | 7/2003 | Nguyen et al. |
| 2004/0143527 A1 | 7/2004 | Benkert et al. |
| 2004/0181513 A1 | 9/2004 | Henderson et al. |
| 2005/0027551 A1 * | 2/2005 | Mayer .................. G06Q 10/10 705/4 |
| 2005/0149439 A1 | 7/2005 | Suisa |
| 2005/0165682 A1 | 7/2005 | Duke |
| 2006/0202025 A1 | 9/2006 | Calabrese et al. |
| 2007/0205274 A1 | 9/2007 | Bridges |
| 2007/0287413 A1 | 12/2007 | Kleitsch et al. |
| 2008/0167990 A1 | 7/2008 | Grant |
| 2008/0200144 A1 | 8/2008 | Ginsberg et al. |
| 2008/0288376 A1 | 11/2008 | Panthaki et al. |
| 2009/0259547 A1 | 10/2009 | Clopp |
| 2009/0327133 A1 | 12/2009 | Aharoni et al. |
| 2010/0094690 A1 | 4/2010 | Beal |
| 2010/0094699 A1 | 4/2010 | Beal |
| 2010/0250411 A1 * | 9/2010 | Ogrodski .............. G06Q 10/10 705/30 |
| 2010/0325047 A1 | 12/2010 | Carlson et al. |
| 2011/0004498 A1 | 1/2011 | Readshaw |
| 2011/0055076 A1 | 3/2011 | Trifiletti et al. |
| 2011/0078126 A1 | 3/2011 | Walker |
| 2011/0194676 A1 | 8/2011 | Hogan et al. |
| 2011/0251910 A1 | 10/2011 | Dimmick |
| 2011/0313837 A1 | 12/2011 | Katz et al. |
| 2012/0197793 A1 * | 8/2012 | Grigg .................. G06Q 20/105 705/41 |
| 2012/0197937 A1 | 8/2012 | Kakarla et al. |
| 2013/0018792 A1 | 1/2013 | Casey et al. |
| 2013/0036001 A1 | 2/2013 | Wegner et al. |

FOREIGN PATENT DOCUMENTS

| | | |
|---|---|---|
| WO | 2007020394 A1 | 2/2007 |
| WO | 2010129317 A2 | 11/2010 |
| WO | 2011119976 A2 | 9/2011 |
| WO | 2012135796 A1 | 10/2012 |

OTHER PUBLICATIONS

How can we get sms alers for each transaction in SBI ATM?, Wiki Answers, Accessed on Oct. 24, 2013, http://wiki.answers.com/Q/How_can_we_get_sms_alerts_for_each_transaction_in_SBI_ATM.

Mobile Bank Alerts, ICICI Bank, Access on Oct. 24, 2013, http://www.icicibank.com/mobile-banking/alerts.html.

Parent Info—Responsible Shopping, Rocket Cash, article dated Dec. 13, 2000, Accessed on Oct. 24, 2013, http://web.archive.org/web/20001213045200/http://www.rocketcash.com/parent_info/index.php?page=responsible_shopping.

PasaPera Tutorial, Smart Communications, Accessed on Oct. 24, 2013, http://www1.smart.com.ph/Money/use/send-and-withdraw-money/pasapera/tutorial.

SMS Banking, Andhra Bank, Accessed on Oct. 24, 2013, http://andhrabank.in/english/smebanking.aspx.

SMS Banking, Axis Bank, Accessed on Oct. 24, 2013, http://www.axisbank.com/agri-rural/speed-banking/sms-banking/instructions-keywords.aspx.

SMS Banking, Union Bank of India, Accessed on Oct. 24, 2013, http://www.unionbankofindia.co.in/personal_alternate_smsbanking.aspx . . . .

SMS Services, Deutsche Bank, Accessed on Oct. 24, 2013, http://www.deutschebank.co.in/sms_alert.html.

International Search Report and Written Opinon dated Feb. 4, 2015 for PCT Application No. PCT/US2014/060386.

* cited by examiner

ACCOUNT LOCKING USING TRANSACTION CODES

BACKGROUND

Many accountholders of payment accounts wish to authorize their children to access funds associated with the payment accounts. Many payment systems, such as those including credit accounts and debit accounts, have methods in place to allow a primary accountholder to grant or revoke access to or from the accountholder's child.

For example, some credit card issuing banks allow primary accountholders to add their children as credit card authorized users. These banks may issue a subsidiary card that allows the authorized users to access the payment account by swiping the subsidiary card at various merchants. References in the related art describe various methods for restricting authorized users by creating pre-established rules.

SUMMARY

The current disclosure describes computer-implemented methods and computer-based payment systems that provide improved account control mechanisms using transaction codes.

A computer-implemented method of configuring a payment service subaccount is disclosed. The method includes generating a transaction code for a transaction that is initiated with the payment service subaccount. The transaction code includes information identifying a merchant of the transaction. The method also includes identifying an administrator of the payment service subaccount using an account hierarchy and a hierarchical position of the payment service subaccount in the account hierarchy. The method also includes generating a control interface that allows the administrator to use the transaction code to create a locking rule for a future transaction which will take place at the merchant using the payment service subaccount. The method also includes storing the locking rule. The method also includes applying the locking rule to the future transaction.

A computer-implemented method of authorizing a transaction that uses a payment service is also disclosed. The method includes generating a transaction code for the transaction that is initiated with a payment service subaccount. The transaction code including transaction information. The method also includes determining whether to place a lock on the transaction. If, based on the determining step, the lock should be placed on the transaction, the method proceeds with placing the lock on the transaction, identifying an administrator of the payment service subaccount using an account hierarchy and a hierarchical position of the payment service subaccount in the account hierarchy, transmitting an authorization request including the transaction code to a portable electronic device of the administrator, and removing or maintaining the lock based on an authorization response received from the portable electronic device of the administrator in response to the authorization request. If, based on the determining step, the lock should not be placed on the transaction, the method proceeds with allowing the transaction to proceed.

The present invention is better understood upon consideration of the detailed description below in conjunction with the accompanying drawings and claims.

DETAILED DESCRIPTION

A detailed description of one or more embodiments is provided below along with figures that illustrate various principles of the one or more embodiments. Described herein are payment systems and methods for locking accounts from conducting certain transactions. The systems and methods described herein (i) involve reduced payment service and/or payment processing entities, and (ii) provide a cohesive and effective solution to granting and revoking authorization for specific transactions.

Figure 1:
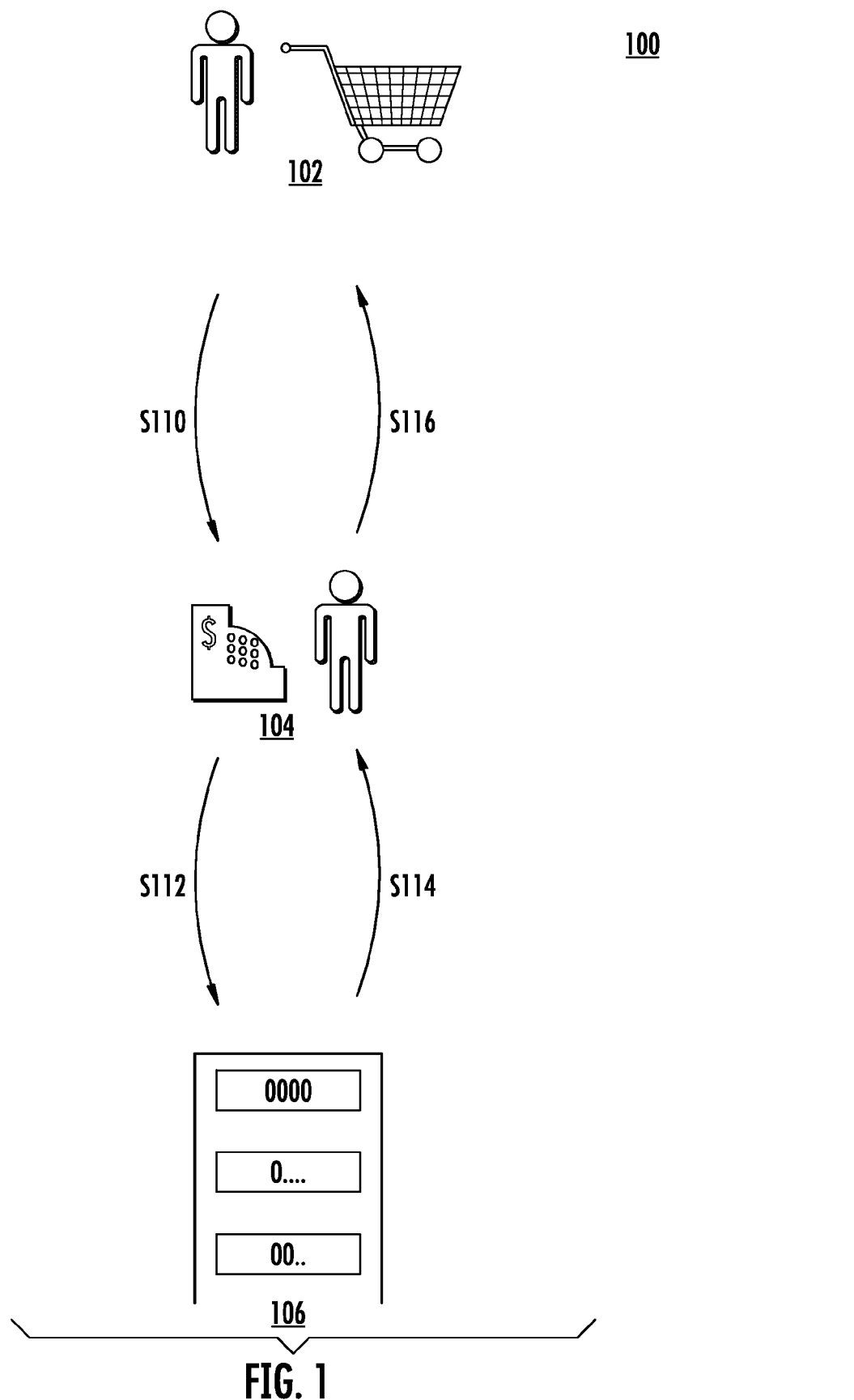
FIG. 1 is a flow diagram illustrating an exemplary method for processing and settling purchase transactions.

FIG. 1 is a flow diagram illustrating an exemplary payment service 100 for processing and settling purchase transactions according to an embodiment. In the payment service 100, a purchaser 102 initiates a transaction at S110 with a merchant 104. The merchant 104 requests authorization at S112 from a payment system 106. The payment system 106 returns an authorization response at S114 to the merchant 104. The merchant 104 then provides goods and services at S116 to the purchaser 102 depending on the authorization response received at S114.

The payment service 100 is preferably a closed system, such that payment processing downstream from the merchant 104 can be handled by a single business entity, such as payment system 106. Further, in such a closed system, merchants can provide additional information that the payment service 100 can use to not only efficiently process transactions, but also to provide additional features. Preferably, merchants use point-of-sale (POS) devices (not shown) that can be considered parts of the payment system and that can be pre-configured to work with the rest of the closed system.

The closed-system approach has several advantages over the related art, where a complex network of different entities and organizations can become involved in an otherwise simple purchase transaction between a purchaser and a merchant. This complex network introduces costs to the system in the form of coordination costs spent negotiating a standard for securely and efficiently transferring the information needed to conduct a transaction. In particular, if one entity determines that a slight modification to the system could be made to render a particular improvement, such as providing additional information to the transaction participants, that entity may be unable to implement that modification without negotiating with all of the counterparties in the system over how that modification should be implemented.

The closed-system approach allows for more precise control of transaction information. A typical credit or debit card transaction requires a purchaser to interact directly or indirectly with a merchant, a payment service such as a credit card processor, and at least one financial institution such as a bank. In such a system, each entity in the transaction may only have access to the amount of information necessary to conduct its role in the chain of payment processing, so information can be lost along the chain. In addition, due to the fact that separate entities need to protect themselves from fraud and errors that may be introduced by their counterparties, each link in the chain requires a certain degree of verification or authorization information which places constraints on the transaction information that can be routed through the system. Furthermore, the fact that multiple parties are transferring information increases the number of potential security leaks in the system that may expose that information to unscrupulous external threats. This factor also places constraints on the transfer of information within the system. In contrast, the closed-system approach simplifies the amount and scope of information that must move between entities, because only the single closed system—rather than multiple entities—performs all payment functions downstream of the merchant. As the aforementioned constraints on information transfer are alleviated in a closed system, the system administrators can modify the nature of information transfer within the system to adapt to any kind of purpose that transaction information can be applied to. Furthermore, the closed-system approach allows for additional features—described below—because all of the transaction information in the system is accessible by the system.

Figure 2:
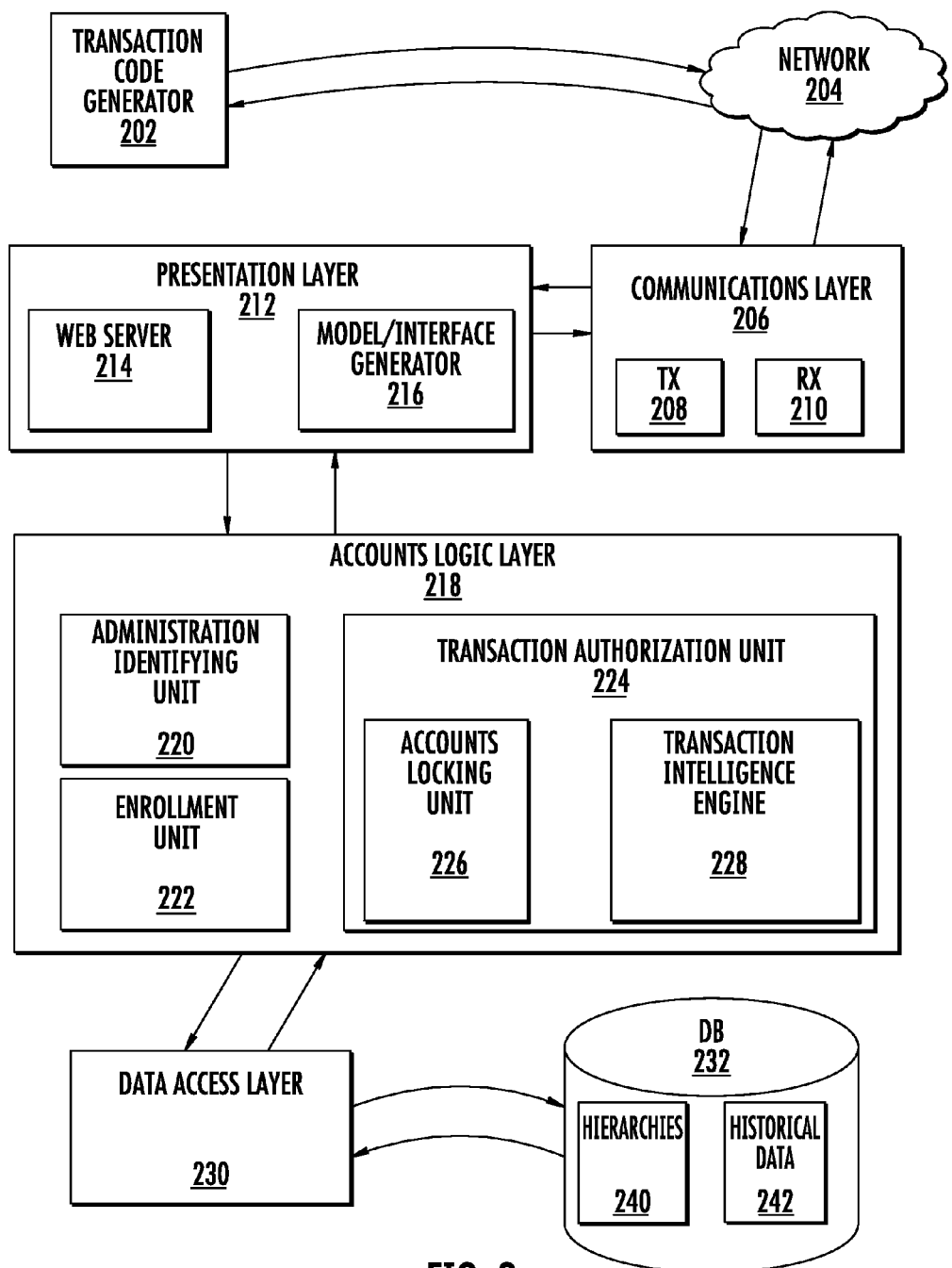
FIG. 2 is an architecture diagram of a portion of an exemplary payment system.

FIG. 2 is an architecture diagram of an exemplary payment system 200 according to an embodiment. Components of the system's architecture are described in the context of an exemplary flow for a transaction authorization request that is created when a transaction is initiated by a purchaser. However, the architecture can handle a variety of other financial transactions and communications as described further below.

A transaction code generator 202 can retrieve details of the transaction to generate a transaction code. See, e.g., FIG. 4. The transaction code generator 202 can be a module that is integrated into the merchant's POS device. For example, the generator 202 can be built-in to the POS device, or it can be subsequently created by downloading and installing instructions remotely to the POS. The transaction code generator 202 can also be a removable device that is attachable to and detachable from the merchant's POS device—for example, the generator 202 can have a USB, Bluetooth, ZigBee or other communications interface for integrating into the merchant's POS device. Finally, the transaction code generator 202 can also run on the server side of network 204 and receive transaction information in alternative formats from other devices connected to network 204 upon which the transaction code generator will operate.

The transaction code can be sent in a transaction authorization request over a network 204 to a communications layer 206 of the payment system 200. The communications layer 206 includes a transmission unit 208 and a reception unit 210 that act as a transceiver for communicating over the network 204. The communications layer 206 forwards the transaction authorization request to a presentation layer 212.

The presentation layer 212 includes a front-end application server such as a web server 214 and a model/interface generator 216. The web server 214 can receive the transaction authorization request, perform any necessary front-end processing, and forward the transaction authorization request to the accounts logic layer 218. The model/interface generator 216 can generate a presentation model and interface that is displayed to the purchaser, the merchant, and/or an administrator upon receiving a transaction authorization response from the accounts logic layer 218.

The accounts logic layer 218 can perform most processing related to the transaction and account. For example, upon receiving the transaction authorization request from the presentation layer 212, an administrator identifying unit 220 identifies an administrator of a subject account with which the transaction was initiated, for example, by querying a database 232 through a data access layer 230 to retrieve and traverse one or more hierarchies (see FIG. 3) that include the subject account.

The accounts logic layer 218 can also include an enrollment unit 222. The enrollment unit 222 can process new enrollments of payment service participants such as purchasers and merchants. The enrollment unit 222 can further process all requests and responses related to management of accounts. The enrollment unit 222 can ensure that registration data is stored in a format that is in accordance with data formatting requirements such as storage in a lookup table as described below. For instance, a new merchant "Hard Rock Bicycles" may be assigned merchant code HRB01 and be assigned merchant classes BKE (short for "bicycle"), SPRT (short for "sporting goods"), and RPR (short for "repair"). The assigned merchant classes can either be self-reported by the merchant, or can be determined based on third-party data sources. For example, a merchant may be able to characterize themselves to the payment system during their enrollment. These values can be stored in lookup table Merchant LUT for later retrieval and processing. Aspects of the enrollment unit 222 can also benefit from the closed-system approach, because the system both assigns the classifications and processes the transactions, thus allowing for uniformity in transaction codes as described in more detail below.

The accounts logic layer 218 can also include a transaction authorization unit 224. The transaction authorization unit 224 can process all requests and responses related to authentication and authorization. The transaction authorization unit 224 can include an accounts locking unit 226 that locks and unlocks accounts and/or transactions. The account locking unit 226 may be called by the transaction authorization unit 224 after a transaction intelligence engine 228 performs intelligent processing, as described with reference to FIG. 7, to help inform the decision of the transaction authorization unit 218 as to whether to lock the subject account or transaction. As an example, the transaction intelligence engine 228 can machine-analyze historical data 242 in the database 232 to inform the decision of whether to lock the subject account or transaction.

Figure 3:
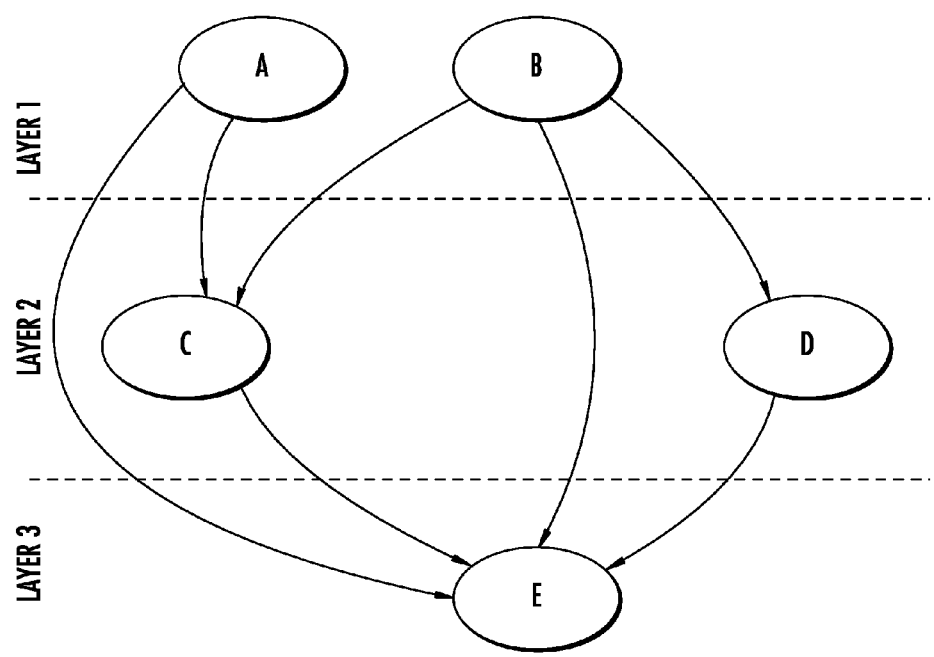
FIG. 3 is a diagram illustrating an exemplary hierarchy.

FIG. 3 is a diagram illustrating an exemplary hierarchy 300. The hierarchy 300 can represent an account hierarchy of authorities with respect to one or more accounts. For example, the hierarchy can include account nodes A-E, each representing a payment account with an associated account holder, and a representation of the hierarchical relationship of those nodes. For example, in hierarchy 300, account A is superordinate to subordinate accounts C and E. In certain embodiments, an account holder of a superordinate account can authorize and lock transactions (e.g., by creating rules) initiated with subordinate accounts. In certain embodiments, an account holder of a payment service subaccount is disallowed from authorizing and locking transactions (e.g., by creating rules) initiated with superordinate accounts. Thus, a purchaser 102 who is a holder of either accounts C or E may require authorization of certain transactions from a holder of account A, and the holder of account C can authorize or lock certain transactions initiated with account E. In this scenario, account C and E can be considered subaccounts of account A.

The hierarchy 300 can represent a user hierarchy of authorities with respect to participants in the payment system. For example, nodes in layer 1 can be financial institutions that are capable of issuing accounts to users. In this example, node B could be associated with a bank and nodes C and D could be account holders that have been issued an account with the payment service through their relationship with that bank. Under this alternative, each user is not required to have an account. As another example, nodes in layer 1 can be associated with financial networks and nodes in layer 2 could be associated with financial institutions in those financial networks with layer 3 being populated by account holders of those particular financial institutions. Although not shown, the entire hierarchy can be subordinate to a single hierarch that is associated with the administrator of the payment service.

The account hierarchy 300 can be stored as any directed graph-like data structure that maintains nodes and vertices, where nodes can have pointers to other nodes (vertices) indicating superordinacy or subordinarcy. Thus, for example, the database may store a separate hierarchy lookup table according to hierarchy 300 as follows.

TABLE 1

| Node | Superordinate Tuple | Subordinate Tuple |
|------|---------------------|-------------------|
| A | (null) | C, E |
| B | (null) | C, D, E |
| C | A | E |
| D | B | E |
| E | A, B, C, D | (null) |

The table can be used to query a relational database—for example, in a JOIN clause that joins an ACCOUNTS table with the foregoing HIERARCHY table—by the administrator identifying unit. The skilled artisan will note that the 'Subordinate Tuple' field does not need to the target of a PROJECT relational operator when identifying an administrator. However, maintaining the column may have other uses, for example, to verify the integrity of the data by ensuring that every entry in the 'Superordinate Tuple' field has an inverse entry in the 'Subordinate Tuple' column.

The hierarchy 300 can also include additional information regarding authorities. For example, node E has superordinate nodes A, B, C, and D but a transaction initiated with node E must be authorized by A, by B, or by C and D. As another example, the hierarchy 300 may be integrated with specific rules. Rules can be quota-based. Transactions using account E exceeding $1,000 must be authorized by A and B, exceeding $100 must be authorized by A or B, and exceeding $20 must be authorized by A, B, C, or D. Rules can be merchant-based. Transactions using account E at merchant M1 must be authorized by A, B, or C while transactions using account E at merchant M2 must be authorized by A, B, or D.

Figure 4:
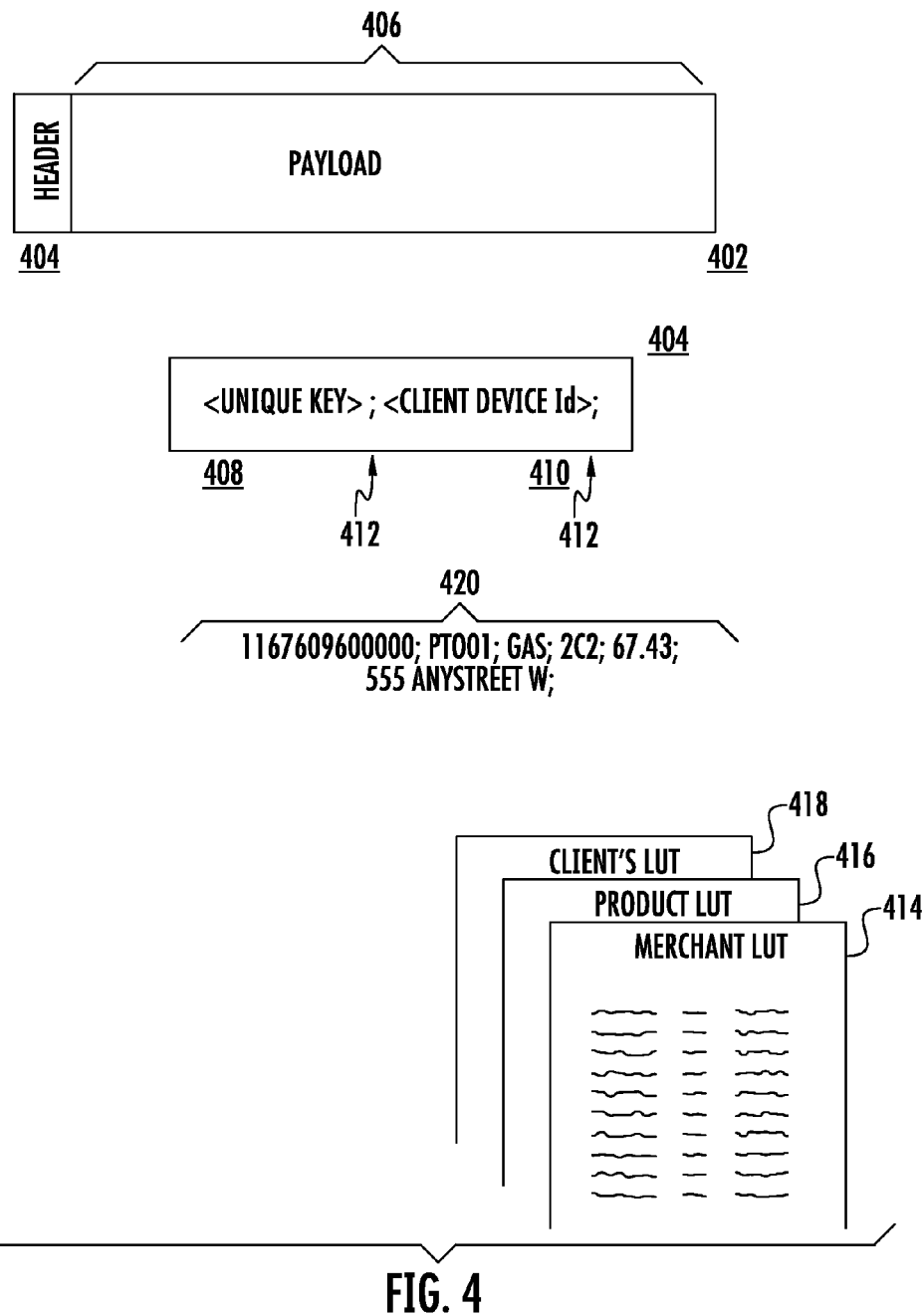
FIG. 4 is a diagram illustrating an exemplary transaction code design.

FIG. 4 is a diagram illustrating an exemplary transaction code design according to an embodiment. The transaction code is generated to include information regarding the transaction and to be portable for a variety of uses. Transaction information of a transaction can include, but is not limited to: a time that the transaction was initiated; transaction classification information (e.g., lease, lease-to-own, purchase, installment purchase, etc.); payment type (e.g., one-time or continuing at a predetermined duration such as monthly); a requested amount of the transaction including breakdowns sales tax, shipping, and other associated fees and charges; purchaser authentication information; purchaser classification information; merchant authentication information; merchant identification; merchant classification information (e.g., industry and online versus brick-and-mortar); goods and services identification; and goods and services classification information. (As used herein, the term "goods and services" can include goods and/or services.) The transaction code can include any subset of the transaction information.

The transaction codes can be sent through the system in various ways. For example, the transaction code can be sent in one or more network packets in a packet switched network. An exemplary datagram 402 for a transaction code can contain a header 404 and a payload 406. The header 404 can include information such as a unique key 408 that uniquely identifies the packet (e.g., determined by parsing the timestamp and purchaser authentication information) and any other metadata for the transaction code (e.g., a unique client device ID). The payload 406 can include transaction information, for example, as provided above. Header and payload fields can be separated by common delimiters 412 such as a semicolon as depicted.

The transaction code can be generated by a POS device, by a portable electronic device of the purchaser, or by a server of the system—that is, the transaction code generator can run at those locations and platforms. The transaction code generator can generate the transaction code by looking up particular lookup values in lookup tables 414-418. For example, a transaction code generator running on a POS device at the merchant might have lookup tables Merchant LUT 414, Product LUT 416, and Clients' LUT 418. The lookup tables on a client-side device (e.g., POS device) can be synchronized with remote servers at periodic intervals or using known timestamp synchronization techniques. The lookup tables provide information allowing the transaction code generator to generate a transaction code in accordance with uniform requirements throughout the closed system. For example, every merchant may be assigned a unique five-character alphanumeric identifier, such as PTO01. When this code (or any other transaction codes representing transaction information) are received by other components and modules in the closed system, data uniformity guarantees that the receiving components and modules can receive, decode, and understand the code for further processing.

The merchant's goods and services may be inventoried in the Product LUT 416. The Product LUT 416 can be synchronized with the merchant's own inventory system and then synchronized to a SKU database at the server-side database. Alternatively, the system may automatically propagate a generic entry in Product LUT 416 based on the information available in Merchant LUT 414. For example, if a merchant is characterized as a restaurant the Product LUT can be automatically filled with a single entry that identifies the product of the transaction such as "Dining Out" or "REST."

The transaction code generator can use the Clients' LUT 418 to determine if the purchaser has registered in the merchant's system, thus enabling a promotion finder module (not shown) to determine if any promotions or discounts apply to the purchaser. Because the closed system is secure and thus tightly controllable, intra-merchant promotions can more easily be determined in the closed system. For example, because the transaction code can contain promotion information, the system can determine if similar promotions would be offered to the purchaser by a competitor and can match those similar promotions (e.g., pricematching). The closed system thus allows merchants to better retain their clientele through intra-merchant lookups by using any combination of the exemplary lookup tables 414-418. The intra-merchant lookup results can be provided in an encrypted format and only to a promotion finder module in the closed system on an as-needed basis, thus securing merchants' private information from being freely used by competitors.

The transaction code generator can generate transaction codes in accordance with any system requirement. The closed system may use proprietary data formats and/or run over proprietary communications channels. For example, the payload 402 can be segmentized or delimited in a uniform format that can be quickly parsed and understood by a receiving component or module. The transaction code generator may also generate a transaction code within a certain length in accordance with system- and/or client-specific requirements. For example, to meet a requirement that data will be communicated by a short message service (SMS), the transaction code generator may fit the transaction code within 160 characters for transmission in an SMS 420. As another example, to meet a bandwidth restriction, the transaction code generator may fit the transaction code within a predetermined byte- or character-limit. As mentioned previously, a closed-system approach assures that changes in the business requirements of the participants in the payment system can be quickly accommodated by modifications to the transaction codes and the transaction code generator.

Figure 5:
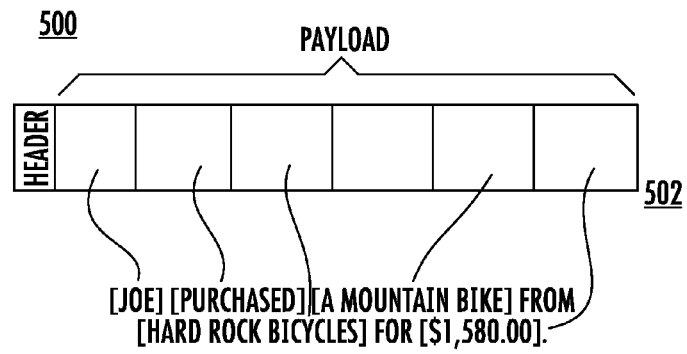
FIGS. 5 and 6 illustrate exemplary interface components for controlling and configuring accounts.
Figure 6:
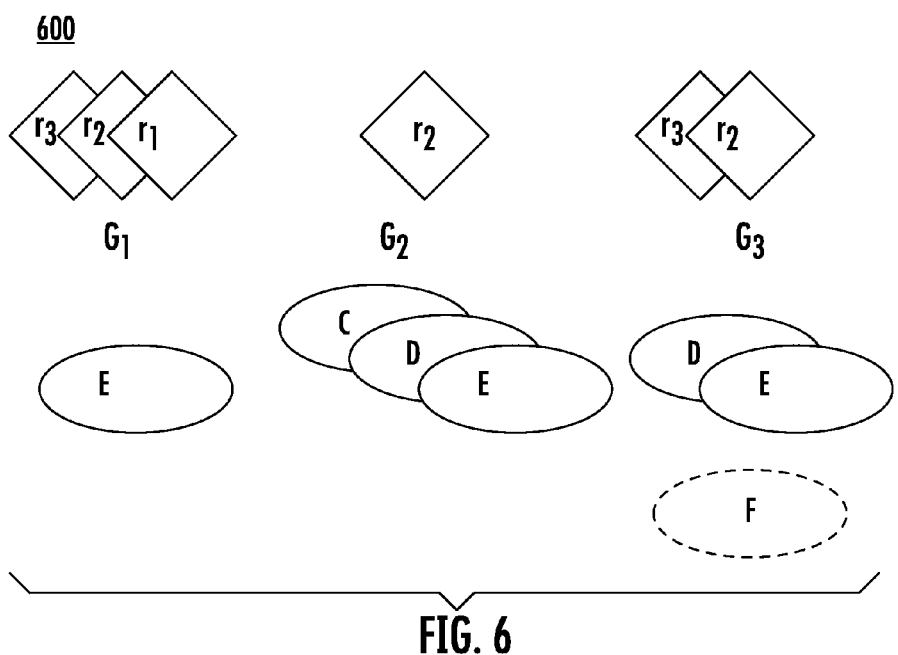

FIGS. 5 and 6 illustrate exemplary interface components for controlling and configuring accounts. FIG. 5 shows how the system can create or allow users to create (i.e., through a control interface 500) a new rule from a transaction code 502. The user presented with this interface can be an account holder of a superordinate account creating a rule for a subordinate account or an administrator at a financial institution creating a rule for account holders associated with the financial institution that are subordinate to the financial institution in the payment system hierarchy. Particular users may be able to configure what information is displayed for each transaction and how that information is displayed. For example, a financial institution may prefer to have the information provided in spreadsheet form whereas a parent administrating a child's subaccount may prefer to have the information provided in prose form as shown in FIG. 5. As described in more detail below, the control interface may also provide users with the ability to apply rules to additional accounts that were not directly used in the transaction that generated transaction code 502. For example, an account holder may decide to apply a blanket ban on all subaccounts from conducting transactions at a particular merchant upon first receiving a transaction code involving a transaction at that merchant.

As in the particular embodiment shown in FIG. 5, the payload of the transaction code 502 can be parsed by a receiving component or module (e.g., the accounts logic layer) and then translated into prose format, for example, by parsing the payload segments of the transaction code 502 and comparing them to values in lookup tables similar to those described above. The looked up values (shown in brackets in FIG. 5) can then be provided as input to the formulation of a natural language question 504, thus allowing an administrator to better understand the transaction associated with transaction code 502 in the control interface 500. In certain cases the transaction code and looked up values may be identical such that a lookup table was not actually necessary. Upon reviewing the transaction associated with the transaction code 502, a user can create a new rule $r_1$ by selecting the look up values for the rule inputs as shown. For example, a user may be able to select the look up value associated with the account holder rule input and change it from a single account holder to all subaccount holders that are subordinate to the user. The user can also change the merchant rule input to cover an entire category of merchants or be provided with a list of recommended related merchants upon which to base a rule.

Rules can be prohibitive in nature. Thus, a rule may call for certain transactions to be locked based on any of the transaction information. For example, a rule may call for certain transactions to be locked based on time, location, merchant identification, merchant classification, product identification, product classification, amount, promotion information, or any other transaction information.

Further, it is not necessary that rule-creation be based on one transaction only. The system can analyze multiple transactions to determine trends, sums, averages, and any other known statistical measure of merchants, products, locations, amounts, and any other piece of transaction information. The analysis result can then be provided to the administrator as a suggestion for a new rule. Thus, by adding a transaction code to a list of rules or rule suggestions that did not previously include the transaction code prior to the transaction being initiated, the system can learn and better refine its suggestions.

FIG. 6 shows an exemplary account-creation interface 600 in which the administrator can create new accounts with previously-created rules. The account-creation interface 600 can present to the administrator a grouping of rules and all—preferably subordinate—accounts to which the grouping applies. As shown, rules $r_1$, $r_2$, and $r_3$ belong to group $G_1$ and apply to account E; rule $r_2$ belongs to group $G_2$ and applies to accounts C, D, and E; and rules $r_2$ and $r_3$ belong to group $G_3$ and apply to accounts D and E. Upon seeing these interface components, the administrator can easily select to create a new subordinate account F to which rules $r_2$ and $r_3$ apply.

Figure 7:
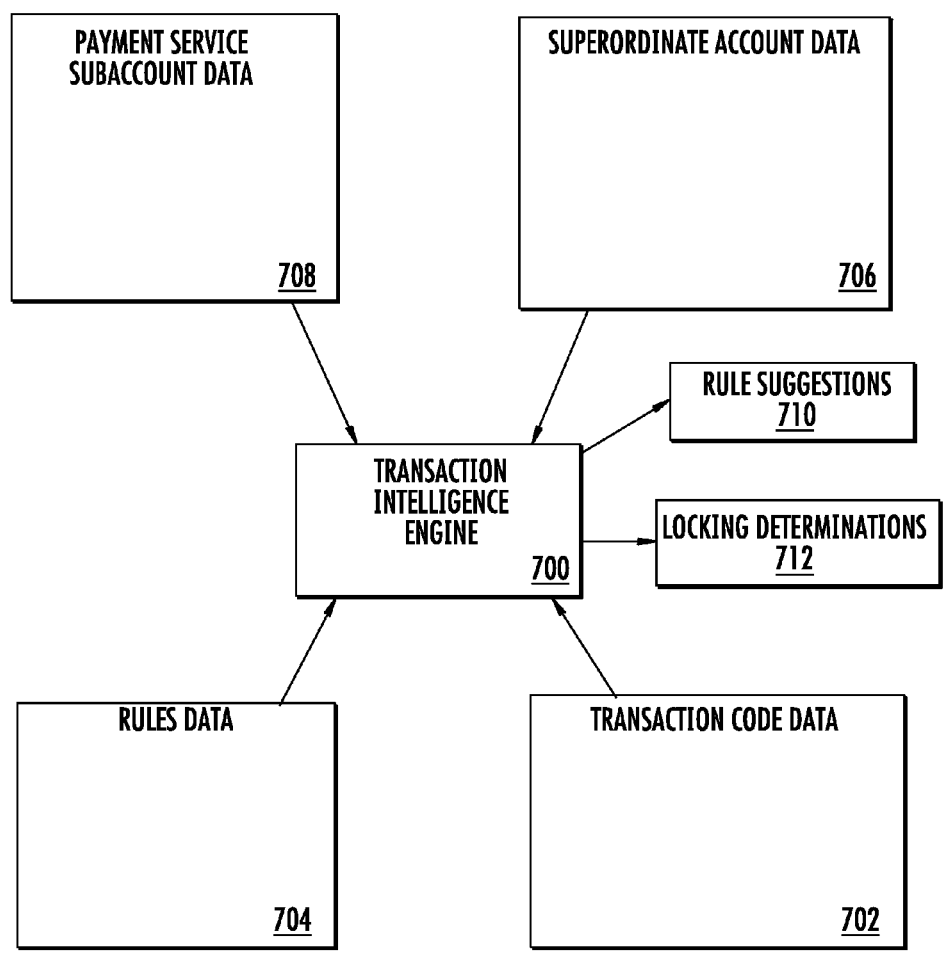
FIG. 7 is a flow diagram of an exemplary transaction intelligence engine.

FIG. 7 is a flow diagram of an exemplary transaction intelligence engine 700 according to an embodiment. The transaction intelligence engine 700 can take as input various data sources 702 and output rule suggestions 710 and locking determinations 712. The transaction intelligence engine 700 can run offline or on-the-fly when analyzing data sources 702, 704, 706, and 708 to make rule suggestions 710 for new-rule creation and/or for rule application. The transaction intelligence engine 700 can run on-the-fly when analyzing data sources 702, 704, 706, and 708 to make locking determinations 712.

To create rule suggestions 710, for example to display on the control interface, the transaction intelligence engine 700 can analyze payment service subaccount data 708, superordinate account data 706, rules data 704, and/or transaction code data 702. For example, the transaction intelligence engine 700 can analyze the rules data 704 and payment service subaccount data 708 to recognize that many subaccounts whose primary accountholder is younger than 18 have an average monthly spending limit of $748.12, and the transaction intelligence engine 700 can output a rule suggestion accordingly. As another example, the transaction intelligence engine 700 can analyze the payment service subaccount data 708 and the transaction code data 702 to recognize that account E has been increasing its purchases at video games retailers, and the transaction intelligence engine 700 can output a rule suggestion accordingly. As another example, the transaction intelligence engine 700 can analyze the superordinate account data 706, the rules data 704, and the transaction code data 702 to recognize that an administrator previously rejected all requests for authorization of alcoholic products, and the transaction intelligence engine 700 can automatically lock the transaction by default and return the analysis results to the administrator in an accompanying authorization request. As another example, the transaction intelligence engine 700 can analyze, in connection with a transaction code, the transaction code data 702 and the rules data 704 to recognize that no rule allows or prohibits a transaction associated with the transaction code (e.g., the merchant of the transaction does not appear on either a blacklist or a whitelist of merchants and/or goods and services). Without an applicable rule, the transaction intelligence engine 700 can return results accordingly to the system which can be set to, by default, temporarily lock the transaction and seek authorization from an identified administrator.

Because the transaction intelligence engine 700 machine-analyzes data sources with statistical tools, larger datasets better inform the transaction intelligence engine 700. Thus, a closed system has the advantage of having access to more information (such as information from other accounts in the system), since security and privacy requirements are easier to maintain when no third-party has access to the data, and the data can be better guaranteed to be used only for machine-analysis.

The transaction intelligence engine 700 is not limited to the illustrated data sources, as other data sources can be used. For example, the transaction intelligence engine 700 can analyze a merchant's historical data. Such a data source becomes more accessible in a closed system that has access to all of its own historical data.

Figure 8:
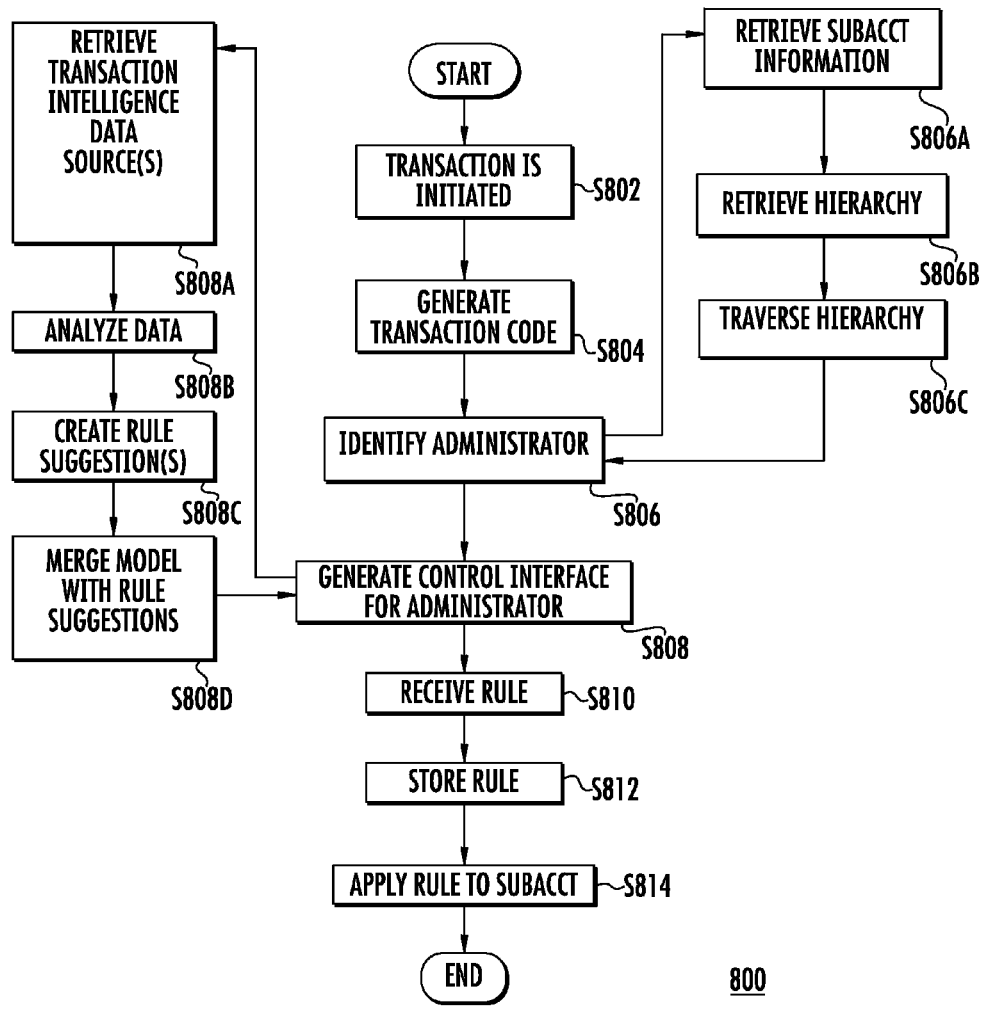
FIG. 8 is a flow diagram of an exemplary control interface generation method.

FIG. 8 is a flow diagram of an exemplary control interface generation method 800 according to an embodiment. To start the method 800, a transaction is initiated by a purchaser using a payment service subaccount at step S802. A transaction code is generated by the transaction code generator at step S804. The administrator identifying unit identifies an administrator using the transaction code at step S806 by executing subroutines to retrieve the subaccount information at S806A, retrieve the hierarchy from the hierarchy storage at S806B, and traverse the hierarchy at S806C. The identification can occur offline at any time after the transaction code is generated, or the identification can occur on-the-fly as part of authentication, for example. After the administrator is identified, a control interface is generated for the administrator at S808 by executing subroutines to retrieve data from data sources for the transaction intelligence engine at S808A, analyze the data with the transaction intelligence engine at S808B, create rule suggestions with the transaction intelligence engine at S808C, and merge a presentation model with the rule suggestions at S808D. The model/interface generator merges the results to present to the administrator. The administrator can then create a new rule, which the system receives along with other parameters at S810, stores at S812, and applies to a subaccount in accordance with received parameters at S814. The subaccount to which the new rule is applied can be a different subaccount from the subaccount with which the transaction was initiated.

Figure 9:
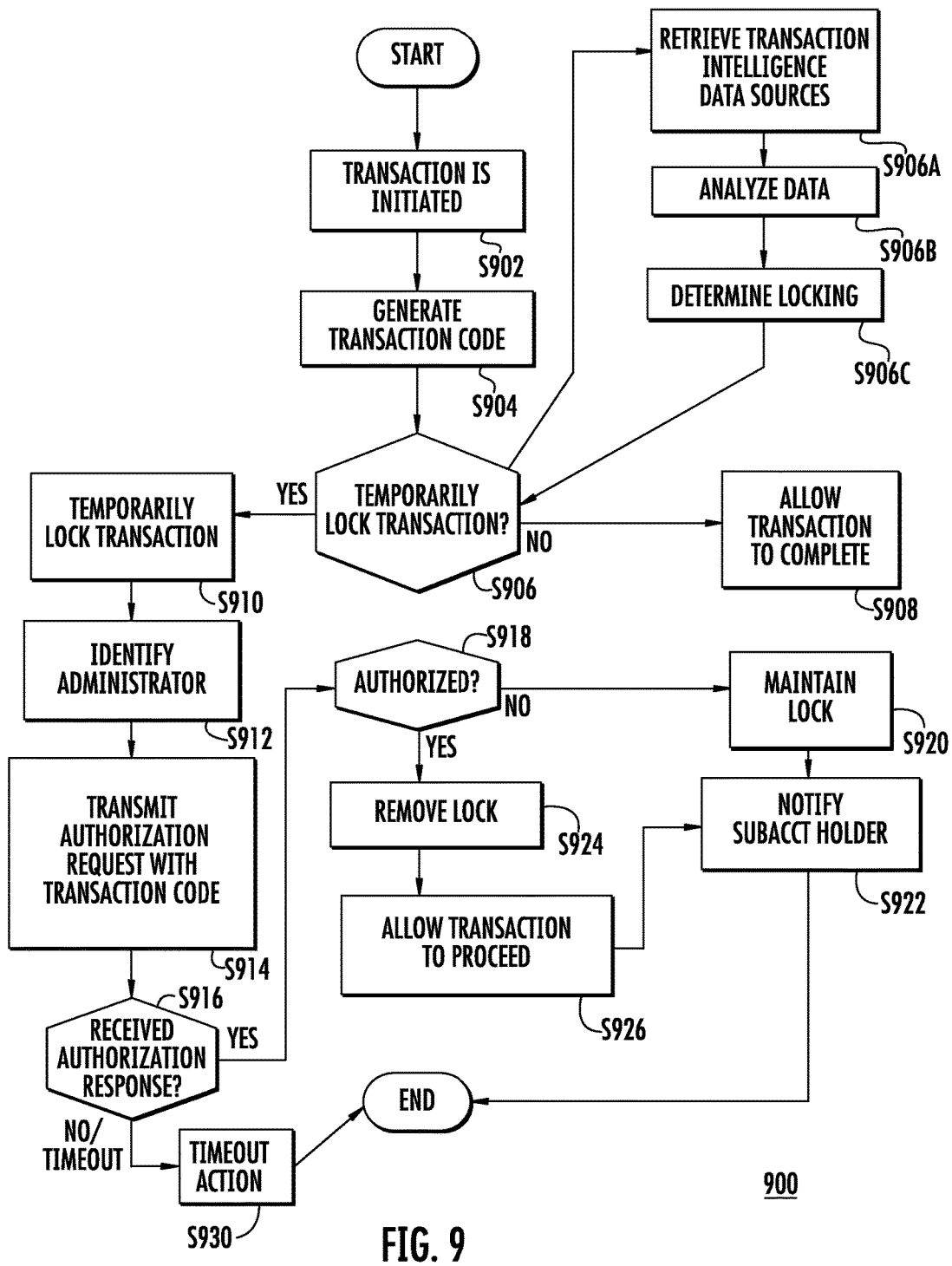
FIG. 9 is a flow diagram of an exemplary method that provides an improved account control mechanism.

FIG. 9 is a flow diagram of an exemplary authorization method 900 according to an embodiment. To start the method 900, a transaction is initiated by a purchaser using a payment service subaccount at step S902. A transaction code is generated by the transaction code generator at step S904.

At S906, the transaction intelligence engine determines whether to temporarily lock the transaction by executing subroutines to retrieve data from data sources at S906A, analyze the data with the transaction intelligence engine at S906B, and determine with the transaction intelligence engine whether to temporarily lock the transaction with the accounts locking unit at S906C. If the transaction should not be temporarily locked, the transaction is allowed to complete at S908. If the transaction should be temporarily locked, the accounts locking unit temporarily locks the transaction at S910. Then, the administrator identifying unit identifies an administrator at S912, and the accounts logic layer transmits an authorization request to the identified administrator, for example to the administrator's terminal or portable electronic device, through the communications layer at S914. The portable electronic device can be contacted using SMS or a mobile call to a phone number that is associated with at least one of the device and the superordinate account, using email, or using a thick client app running on the portable electronic device. The authorization request can include the generated transaction code, and the administrator's portable electronic device can either have sufficient information (e.g., lookup tables included with a thick client application) to decode the transaction code, or it can further receive decoded transaction information from the system (e.g., included with the authorization request).

The system then awaits an authorization response from the administrator at S916. If the system receives an authorization within a predetermined period of time (or, for example, detects that the administrator requires more time to decide) at S916, the accounts logic layer determines whether the administrator authorized the transaction at S918. Thus, the system can attempt to attain authorization from an administrator of a payment service subaccount in real-time or near-real-time, as the transaction is occurring. If the administrator did not authorize the transaction, then the accounts locking unit maintains the temporary lock (e.g., it either does nothing or it turns the temporary lock into a permanent lock that may subsequently be removed only by an administrator). The subaccount holder who initiated the transaction is notified immediately at S922, and the method 900 ends. If the administrator authorized the transaction, then the temporary lock is removed by the accounts locking unit at S924, the transaction is allowed to proceed at S926, and the method 900 ends.

An authorization interface displayed to the administrator who receives the authorization request can include options to approve the transaction, toll the timeout period, contact (e.g., SMS or call) the subaccount holder (which, preferably, automatically tolls the timeout period), decline the transaction, and/or create a rule for all future transactions. The option to create a rule is transmitted with a rule flag in the authorization response so that the system can create a new rule to be applied to the subaccount for future transactions.

If the system does not receive an authorization response within a predetermined period of time (and, for example, does not detect that the administrator requires more time to decide) at S916, the system defaults to a timeout action at S930. After the timeout action completes at S930, the method 900 ends. The timeout action can be preconfigured by an administrator and can include any action. For example, the timeout action can be to maintain the lock and notify the subaccount holder accordingly, for example, following steps S920 and S922. The administrator can customize the timeout actions according to various rules—for instance, the lock will be maintained only when shopping at online merchants, but the lock will be removed when shopping at brick-and-mortar merchants to avoid public embarrassment of having a transaction declined when the administrator is unavailable. As another example, the notification can change the communications method, for example to change a notification setting on the administrator's mobile phone such that calling the administrator's mobile phone makes the phone vibrate and ring at max volume, when no authorization response is received within the initial timeout period. In this example, the system may be set to automatically attempt to connect a call between the subaccount holder who is initiating the transaction and the administrator. As another example, if the subaccount has multiple administrators, the system can attempt to contact the administrators in a configurable sequence.

The transaction intelligence engine can also play a significant role in the timeout scenario. If no authorization response is received within the timeout period, the transaction intelligence engine can automatically decide whether to maintain or remove the lock on or from the transaction, based on its analysis, for example, as described in examples above.

While the one or more embodiments are described in detail with respect to specific embodiments of the invention, it should be appreciated that those skilled in the art, upon attaining an understanding of the foregoing description, may readily conceive of alterations to, variations of, and equivalents to the one or more described embodiments. These and other modifications and variations to the present invention may be practiced by those of ordinary skill in the art, without departing from the spirit and scope of the present invention. Furthermore, those of ordinary skill in the art will appreciate that the following description is by way of example only, and is not intended to limit the invention. Thus, it is intended that the present subject matter covers such modifications and variations.

Accordingly, the invention can be implemented in numerous ways, including as an apparatus, a system, a device, a computer-implemented method, and/or a computer-readable medium such as a non-transitory computer-readable storage medium with computer-readable instructions or other program code, which when executed by one or more processors, cause a computer to perform a method in accordance with the one or more embodiments. Examples of a medium includes, but is not limited to, circuit-based media (e.g., read-only memory, flash memory, solid-state drive), magnetic media (e.g., hard drive, tape, floppy disk, magstripe card), optical media (e.g., compact disc, digital versatile disc, Blu-ray Disc), and any combination of such media. An example of a system is a computer-based system with one or more processors executing instructions on one or more network-attached nodes. A processor can be any hardware-based processing device including, but not limited to, a central processing unit with one or more cores, a reduced-instruction set processor, a field-programmable gate array, a general purpose graphics processing unit, and any combination of such processing devices. A network can run over any physical communications medium, including, but not limited to, Ethernet, WiFi, infrared, universal serial bus, optical fiber, Bluetooth, telephone network, bus interfaces, and any combination of such physical communications media. It should be appreciated that the exact implementation is not limited to any single particular hardware configuration.

What is claimed is:

1. A computer-implemented method of configuring a payment service subaccount, comprising:
    a computerized payment system generating a transaction code for a transaction that is initiated with the payment service subaccount, the transaction code including information identifying a merchant of the transaction, the transaction code providing uniform transaction information as interpreted by a plurality of modules on the computerized payment system, the computerized payment system being a closed-loop payment system;
    the computerized payment system identifying an administrator of the payment service subaccount using an account hierarchy and a hierarchical position of the payment service subaccount in the account hierarchy, the account hierarchy defining a set of accounts in the closed-loop payment system;
    the computerized payment system transmitting the transaction code to an electronic device of the administrator;
    the computerized payment system generating a control interface that allows the administrator to use the transaction code to create a locking rule for a future transaction which will take place at the merchant using the payment service subaccount;
    the computerized payment system storing the locking rule; and
    the computerized payment system applying the locking rule to the future transaction.

2. The computer-implemented method of claim 1, wherein the locking rule has at least one of the following effects when applied to the future transaction:
    prohibits the future transaction from finalizing,
    allows the future transaction to finalize,
    sets a time-based limit for a transaction amount of the future transaction, and
    sets an amount-based limit for a transaction amount of the future transaction.

3. The computer-implemented method of claim 1, wherein the administrator is a holder of a superordinate account of the payment service subaccount in the account hierarchy.

4. The computer-implemented method of claim 3, further comprising:
    the computerized payment system disallowing a holder of the payment service subaccount from creating a second locking rule that can be applied to a second future transaction using the superordinate account.

5. The computer-implemented method of claim 3, further comprising:
    the computerized payment system generating an account-creation interface that allows the administrator to (i) create a new subaccount that is subordinate to the superordinate account, and (ii) apply the locking rule to the new subaccount.

6. The computer-implemented method of claim 5, wherein
    the account-creation interface displays a plurality of subaccounts that are subordinate to the superordinate account such that the subaccounts are grouped by one or more applied rules.

7. The computer-implemented method of claim 1, wherein the control interface further includes historical data relating to at least one of the payment service subaccount and the merchant.

8. The computer-implemented method of claim 1, wherein
    the information identifying the merchant includes information categorizing the merchant in a particular class.

9. The computer-implemented method of claim 1, further comprising:
    the computerized payment system generating a suggestion for an option to the administrator by machine-analyzing at least one of data relating to the payment service subaccount, data relating to the merchant, data relating to previously-selected options by the administrator, and data relating to previously-selected options by other administrators.

10. The computer-implemented method of claim 1, further comprising:
the computerized payment system learning and refining suggestions by adding the transaction code to a list of rules that did not previously include the transaction code prior to the transaction being initiated.

11. The computer-implemented method of claim 1, wherein
the transaction code further includes information categorizing the transaction in a class of transactions, and
the control interface further allows the administrator to use the information categorizing the transaction in the class of transactions to create the locking rule for the future transaction.

12. A computer-implemented method of authorizing a transaction that uses a payment service, comprising:
generating a transaction code for the transaction that is initiated with a payment service subaccount, the transaction code including transaction information, the transaction code providing uniform transaction information as interpreted by a plurality of modules on a server in a closed-loop payment system;
determining whether to place a lock on the transaction;
if, based on the determining step, the lock should be placed on the transaction:
placing the lock on the transaction,
identifying an administrator of the payment service subaccount using an account hierarchy and a hierarchical position of the payment service subaccount in the account hierarchy, the account hierarchy defining a set of accounts in the closed-loop payment system,
transmitting an authorization request including the transaction code to a portable electronic device of the administrator, and
removing or maintaining the lock based on an authorization response received from the portable electronic device of the administrator in response to the authorization request; and
if, based on the determining step, the lock should not be placed on the transaction:
allowing the transaction to proceed.

13. The computer-implemented method of claim 12, wherein the transaction information identifies a merchant involved in the transaction.

14. The computer-implemented method of claim 12, wherein the administrator is a holder of a superordinate account of the payment service subaccount in the account hierarchy.

15. The computer-implemented method of claim 14, wherein
the authorization request is transmitted to the portable electronic device using a phone number that is associated both with the device and with the superordinate account.

16. The computer-implemented method of claim 14, wherein
the determining includes machine-analyzing at least one of data relating to previously-received authorization responses by the administrator and data relating to previously-received authorization responses by other administrators.

17. The computer-implemented method of claim 14, wherein
the determining includes machine-analyzing at least one of data relating to the payment service subaccount and data relating to a merchant identified in the transaction information.

18. The computer-implemented method of claim 16, wherein
the authorization request further includes a suggestion based on the machine-analyzing.

19. The computer-implemented method of claim 14, wherein if the authorization response is received from the portable electronic device of the administrator, the authorization response includes a rule flag, the method further comprising:
generating and storing a new locking rule based on the transaction code and the rule flag; and
applying the new locking rule to a future transaction using the payment service subaccount.

20. The computer-implemented method of claim 19, further comprising:
displaying an account-creation interface that allows the administrator to create a new subaccount that is subordinate to the superordinate account and that is subject to the new locking rule.

21. The computer-implemented method of claim 12, wherein
the transaction information includes goods and services information, and
the determining includes comparing the goods and services information to at least one of a goods and services blacklist and a goods and services whitelist, and
if the goods and services information does not exist in the at least one of the goods and services blacklist and the goods and services whitelist, the payment service determines that the lock should be placed on the transaction.

22. The computer-implemented method of claim 12, further comprising:
if the authorization response is not received from the portable electronic device of the administrator:
maintaining the lock, and
notifying an account holder of the payment service subaccount that the transaction cannot proceed.

23. A computer-based payment system comprising:
a transaction code generator configured to generate a transaction code for a transaction that is initiated with a payment service subaccount, the transaction code including information identifying a merchant of the transaction;
an administrator identifying unit configured to identify an administrator of the payment service subaccount using an account hierarchy and a hierarchical position of the payment service subaccount in the account hierarchy;
an interface generator configured to generate a control interface that allows the administrator to use the transaction code to create a locking rule for a future transaction;
a data access layer configured to store the locking rule; and
a transaction authorization unit configured to apply the locking rule to the future transaction;
and wherein the computer-based payment system is a closed-loop system configured to enroll a plurality of merchants and categorize the merchants.

24. The computer-based payment system of claim 23, wherein the administrator is a holder of a superordinate account of the payment service subaccount in the account hierarchy.

25. A computer-based payment system comprising:
- a transaction code generator configured to generate a transaction code for a transaction that is initiated with a payment service subaccount, the transaction code including transaction information;
- an administrator identifying unit configured to identify an administrator of the payment service subaccount;
- a transmission unit configured to transmit an authorization request; and
- a transaction authorization unit configured to determine whether to place a lock on the transaction such that
  - if the transaction authorization unit determines that the lock should be placed on the transaction, (i) the transaction authorization unit places the lock on the transaction, (ii) the administrator identifying unit identifies the administrator using an account hierarchy and a hierarchical position of the payment service subaccount in the account hierarchy, (iii) the transmission unit transmits the authorization request including the transaction code to a portable electronic device of the administrator, and (iv) the transaction authorization unit removes or maintains the lock based on an authorization response received from the portable electronic device of the administrator in response to the authorization request, and
  - if the transaction authorization unit determines that the lock should not be placed on the transaction, the transaction authorization unit allows the transaction to proceed;
- and wherein the computer-based payment system is a closed-loop system configured to enroll a plurality of merchants and categorize the merchants.

26. The computer-based payment system of claim 25, wherein the administrator is a holder of a superordinate account of the payment service subaccount in the account hierarchy.

27. The computer-implemented method of claim 12, wherein the account hierarchy includes more than two hierarchical levels.

* * * * *